United States Patent Office 3,514,681
Patented May 26, 1970

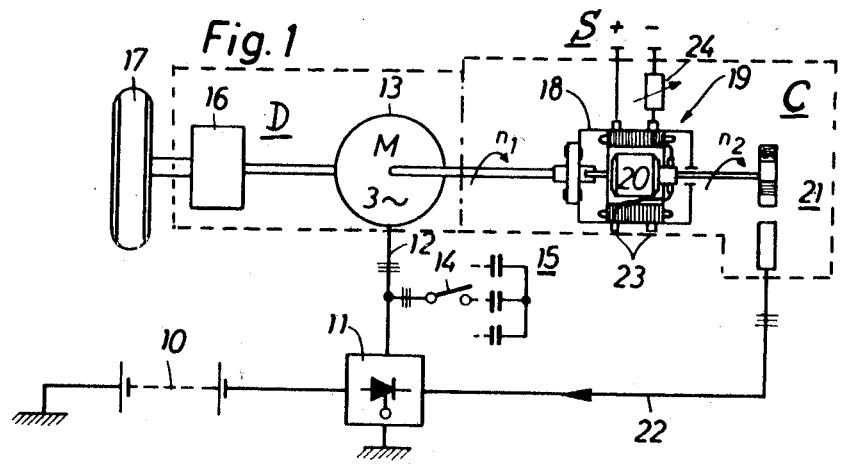
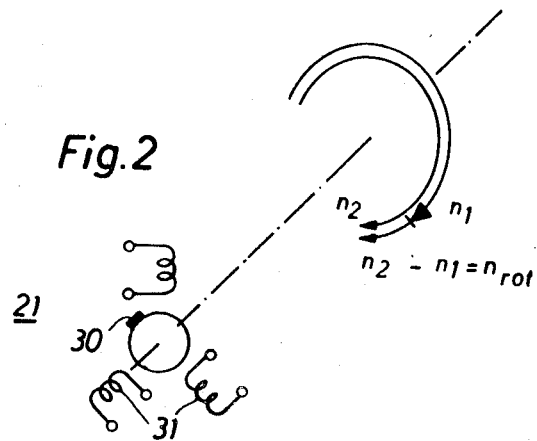
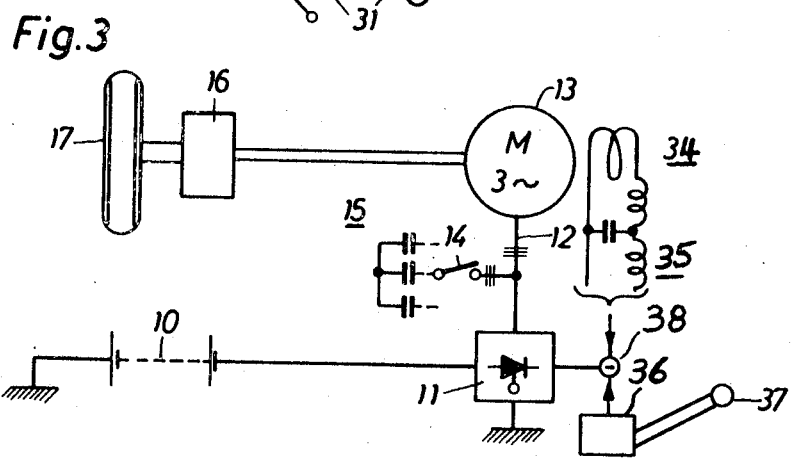

3,514,681
ELECTRIC DRIVE SYSTEM FOR VEHICLES
Walter Dorn and Hans Reinbeck, Stuttgart-Rohr, Germany, assignors to Robert Bosch G.m.b.H., Stuttgart, Germany, a firm
Filed Oct. 23, 1967, Ser. No. 677,137
Claims priority, application Germany, Oct. 25, 1966,
B 89,550
Int. Cl. H02p 5/00
U.S. Cl. 318—139                           1 Claim

ABSTRACT OF THE DISCLOSURE

A D.C. power source, preferably a fuel cell arrangement, provides direct current to a D.C.-polyphase A.C. inverter having a variable frequency output, the frequency of the inverter being controllable by a signal; the output is supplied to an asynchronous polyphase motor. The slip of the motor from synchronous frequency is sensed and a signal is obtained proportional to the slip, which signal is manually modified by a manual control, and used to control the frequency of the inverter.

---

The present invention relates to an electrical drive system for vehicles and particularly to a drive system for use with fuel cells.

Electrical drive system utilizing fuel cells as a prime source of energy have been proposed in which the current delivered is supplied to direct current motors. Such systems have various disadvantages, among which are the losses occurring particularly during starting of the vehicle which decrease the efficiency of the power system; and the difficulty in preventing dirt and contamination from interfering with proper commutation of the D-C motors. This is particularly serious when such vehicles are used in a dusty atmosphere, for example when being used in the construction industry. The collectors, and the brushes then wear rapidly and further, oxidation of the commutators, when exposed to contaminated air, interferes with proper starting after extended pauses in operation.

It is an object of the present invention to provide an electrical drive system for vehicles having a simple yet sturdy construction and which can be easily controlled.

Subject matter of the invention

Briefly, in accordance with the present invention, the D-C derived from the source, for example the fuel cell, is applied to a D-C to A-C inverter to obtain polyphase alternating current. The inverter is of the type which provides an output of variable frequency, the variation in frequency being controllable by a control signal. The variable frequency output current is then applied to an asynchronous motor.

The general construction of the drive, using an asynchronous motor, is very simple and sturdy, and substantially insensitive against dirt or contamination. Further, such motors can be heavily overloaded for short periods, as may be necessary for example upon starting uphill. The inverter can be switched over, as known, to rectifying use during braking, it being only necessary to provide a condenser bank to provide the necessary out-of phase current for the asynchronous motor, and power can even be fed back to the battery, or easily dissipated in resistances. Since all power derived from the battery is changed to mechanical power and none to heat to control starting speed, the overall efficiency of conversion from fuel supplied to the fuel cell to mechanical energy output energy is greatly improved.

Vehicles designed for off-road use, such as construction vehicles, are usually so built that each drive wheel is supplied with its own drive motor. Preferably, each asynchronous motor forms a unitary structural entity with a reduction gearing. The speed change can be made individually controllable, and separately manually, or automatically controlled clutches may further be provided. The drive for the vehicle thus becomes readily controllable and the vehicle can still be driven even if one of the motors should fail to function.

The inverter is readily controlled by sensing the slip of the asynchronous motor from synchronous speed, and utilizing the difference between synchronous frequency and slip frequency as a control signal; this control signal can further be modified, or a specific difference manually introduced in order to change the speed of operation of the drive system.

The structure, organization, and operation of the invention will now be described more specifically with reference to the accompanying drawings, wherein:

FIG. 1 is a schematic diagram illustrating the drive system in accordance with the present invention;

FIG. 2 is a schematic diagram useful to illustrate the operation;

FIG. 3 is a further embodiment of the drive;

Figure 4:
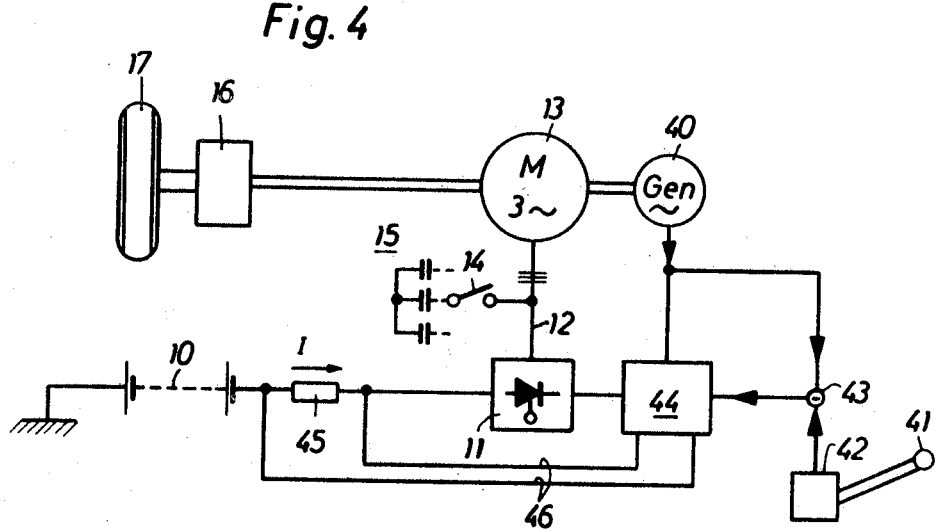
FIG. 4 is still another embodiment of the drive.

Referring now to FIG. 1: a battery 10 formed by a fuel cell assembly provides direct current to an inverter 11 which, as schematically illustrated, includes a group of controlled rectifiers, such as silicon controlled rectifiers (thyristors). Preferably, inverter 11 can be switched over to operate as a full wave rectifier. The specific construction of such inverters-rectifiers by themselves is well known. The output of inverter 11 is a three-phase supply applied over cable 12 to a three-phase asynchronous motor 13, for example a squirrel cage motor 13. A three-phase condenser bank 15 can be connected to the individual lines of cable 12 by means of a switch 14, and which provide the out-of-phase current necessary for magnetization of the motor 13 when the motor is driven by the wheels of the vehicle as a generator, so that the drive system can be used for dynamic braking.

Motor 13 is connected to a step-down transmission 16, preferably forming together with the motor 13 one structural unit as illustrated by the broken lines joining motor 13 and transmission 16 and generally designated drive train D. The drive train D drives wheel 17 of the vehicle. Preferably, the drive train is directly secured to the wheel and to the wheel housing and forms together with it one structural assembly.

A direct current dynamo electric machine 19 has field elements and armature elements. Both these elements are rotatable with respect to the structure of the vehicle. Element 18 is driven by the shaft of asynchronous motor 13 at a speed $n_1$ (FIGS. 1 and 2). The rotor 20 of the dynamo electrical machine 19 drives a pulse generator 21 which, as best seen in FIG. 2, is a rotating permanent magnet 30 providing pulses in three coils 31 spaced 120 electrical degrees apart. The output of the pulse generator 21 is applied over cable 22 as a control signal to the inverter 11. The rotor 20, and hence the magnet 30, rotate at a speed $n_2$. Rotor 20 is supplied with direct current by means of brushes mounted on the element 18, as well known in the art. The stator itself is supplied with direct current form a source S connected to brushes running on slip rings 23 secured to the element 18. One of the slip rings 23 has a controllable regulating resistance 24 in series therewith. The field winding in the element 18 is connected to one of the slip rings 23 and to an additional slip ring connected to the negative terminal of source S, and not shown in FIG. 1 for simplicity.

The series resistance 24 in circuit with the armature, that is with the element 18 enables regulation of the speed of the element 20 with respect to the speed of the element 18.

Operation

To start a stationary vehicle, power is supplied from fuel cell assembly 10 and speed of the machine 19 is adjusted by means of resistance 24 to a few revolutions per minute. This drives pulse generator 21 which controls inverter 11 to supply alternating current to motor 13. The output current supplied to motor 13 will have a low frequency and thus provide for direct starting of the vehicle.

FIG. 2 clearly illustrates the relationship between the speeds $n_1$ and $n_2$ in circular vector form. Additionally, the slip or relative speed between element 18 and element 20 of dynamo electric machine 19 is indicated by $n_{rot}$. As asynchronous motor 13 reaches speed $n_1$, element 18 is likewise driven at that speed, so that the output speed $n_2$ likewise increases, since both element 18 and element 20 turn in the same direction. For example, if element 20 turns at the speed of 15 r.p.m. with element 18 stationary, and then motor 13 reaches a speed of 15 r.p.m., pulse generator 21 will be driven with 15+15=30 r.p.m. The frequency of the pulses supplied by generator 21 likewise rises and with it the frequency of inverter 11 rises, so that the speed of motor 13 further increases.

The arrangement would obviously be unstable if, instead of an asynchronous motor 13, a synchronous motor would be used, since the system would have the tendency to increase the speed indefinitely. A loaded asynchronous motor, however, has slip, since the rotor runs slower than the rotating magnetic field of the stator. Thus, an asynchronous motor having a synchronous speed of 3600 r.p.m which, upon being loaded, operates at a speed of 3564 r.p.m., has a slip of 1 percent. In the system of the present invention, the speed will increase until the difference between synchronous speed of the rotating field of motor 13 and actual speed $n_1$ of the shaft is equal to the speed difference between element 20 and element 18 of machine 19, in the above example 15 r.p.m. If asynchronous motor 13 is a single pole motor, and, correspondingly, pulse generator 21 utilizes only a single permanent magnet 30, the synchronous speed of motor 13 would be 3600 r.p.m. at a frequency of 60 Hz. If, under these conditions, the motor has, due to slip, an actual speed of only 3585 r.p.m., then the system is in balance when the dynamo electric machine 19 rotates at 15 r.p.m. (relatively) and the vehicle wheel 17 will be driven accordingly.

If the vehicle encounters an ascending stretch, the slip will increase and the speed of motor 13 descreases. The frequency of pulse generator 21 will likewise decrease thus decreasing the frequency of the output current of the inverter 11, and decreasing the speed of the vehicle accordingly. If the vehicle goes downhill, the slip decreases and the frequency of the pulse generator 21, as well as that of the inverter 11 increases. The speed of the vehicle will increase until the slip again balances. If the speed of the vehicle increases excessively, the inverter 11 can be switched over to serve as a rectifier. This switch-over can be done automatically, for example by coupling to the brake pedal, or can be separately under control of the driver. Switch-over further introduces a condenser bank 15 into the circuit, by closure of a switch 14, shown schematically, to provide out-of-phase magnetization current. Energy will then be supplied from motor 13 through the inverter 11, now operating as a rectifier back to the fuel cell assembly 10, or to dissipating resistances, for dynamic braking.

The invention is not limited to the use of a direct current motor for the dynamo electric machine 19. Any kind of motor is suitable in which a definite speed between a pair of relatively rotatable elements can be commanded.

FIG. 3 illustrates control of the drive system by means of a slip sensing coil 34. Slip sensing coils, by themselves, are known and are frequently used in electric machinery. Usually, such a coil is wound in the form of a ring and arranged nearly coaxially with the shaft of the motor in one of the gearing housings. A voltage is induced in this coil 34 which varies in synchronism with slip frequency. Low pass filter 35 is provided to filter high frequency noise and harmonic components. The output from slip sensing coil 34, after having been passed through the low pass filter 35, is applied to a comparator 38, in which the difference of the signal from slip coil 34 and from a fixed source 36, the value of which is adjustable by means of a controller 37, is obtained. The difference which can be derived by apparatus well known in the art, is then applied to control the frequency of the frequency controllable inverter 11. Depending on the sign of the output signal from comparator 38, the frequency of inverter 11 is increased or decreased, in order to adjust the desired slip.

Figure 5:
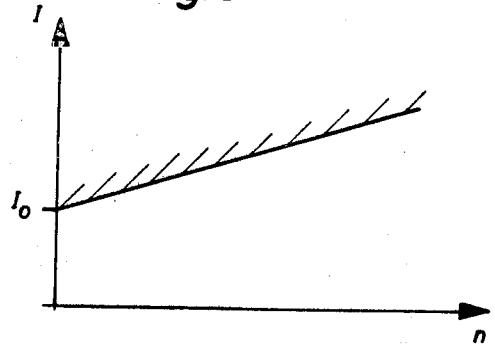
FIG. 5 is a graph of speed (abscissa) vs. current (ordinate) to illustrate the operation of the drive according to FIG. 4.

FIG. 4 illustrates a controller in which an A-C generator 40 is driven by the asynchronous motor 13. Again, a control signal source 42, under manual control as indicated at 41, provides a reference with which the output from generator 40 is compared in the difference circuit or comparator 43. The difference obtained from the comparator 43 is applied to a limit controller 44. A resistance 45 is placed in series with the line supplying current from the fuel cell assembly 10. The current supplied is a measure of the load on motor 13. The voltage drop across resistance 45 is applied over line 46 to controller 44, which will also have the output potential of generator 40 applied thereto. Controller 44 has an internal network having the transfer characteristic illustrated in FIG. 5. If motor 13 is at rest, that is, if no signal is supplied from generator 40, controller 44 limits the current which will be supplied by inverter 11 to a maximum value $I_0$, independently of the position of manual adjustment 41 for controller 42. This can readily be obtained by limiting the frequency of the inverter 11. As the vehicle speed rises, the upper limit of the current which can be supplied likewise rises, corresponding to the increase of power output of motor 13 with speed. The current limiting arrangement illustrated in connection with FIG. 4 can, of course, also be used in the examples previously described in connection with FIGS. 1 and 3. Thus, danger that the driver commands an excessive instantaneous speed, or excessive power from motor 13, thus overloading the motor or even causing stalling thereof, is avoided.

In some arrangement it may be desirable to provide for speed-change transmissions in the transmission 16 and for manually operated clutches.

The drive system of the present invention has been illustrated and described with reference to a wheeled vehicle drive. It is not intended to be so limited and various structural changes and modifications, as determined by the requirements of particular applications or uses may be made without departing from the inventive concept.

We claim:

1. Electrical drive system for vehicles for use with the source of D-C supply comprising
    an asynchronous motor (13);
    a D-C to polyphase A-C inverter (11) of the type having an A-C output of variable frequency, said frequency being controlled by a control signal;
    means supplying power to said inverter from said source (10);
    means (12) connecting A-C power output of said inverter to said asynchronous motor (13);
    a pulse generator (21) connected to said inverter and providing said control signal to control the frequency of operation thereof;
    a D-C motor (19) having a rotatable field element and a rotatable armature element, one of said elements (18) being driven by said asynchronous motor and the other of said elements (20) driving said pulse generator (21); and means (24) controlling the relative speed of said field element and said armature element;

whereby said control signal connected to said inverter will control its frequency of operation and hence of the power supplied to said asynchronous A-C motor in dependence on the position of said means (24) controlling relative speed of said elements and the slip of said asychronous motor.

References Cited

UNITED STATES PATENTS

| | | | |
|---|---|---|---|
| 3,148,320 | 9/1964 | Davis | 318—176 XR |
| 3,164,760 | 1/1965 | King | 318—231 XR |
| 3,297,926 | 1/1967 | Campbell et al. | 318—138 |
| 3,308,371 | 3/1967 | Studtmann. | |
| 3,331,003 | 7/1967 | King | 318—227 |
| 3,355,654 | 11/1967 | Risberg. | |
| 3,395,328 | 7/1968 | Huntzinger et al. | |
| 3,405,338 | 10/1968 | Frola | 318—176 |

G. R. SIMMONS, Primary Examiner

U.S. Cl. X.R.

180—65; 290—15, 29, 49